United States Patent [19]

Munroe et al.

[11] 3,924,937
[45] Dec. 9, 1975

[54] METHOD AND APPARATUS FOR SEQUENTIALLY COMBINING PULSED BEAMS OF RADIATION

[75] Inventors: James L. Munroe, Nonantum; Paul Gregory DeBaryshe, Lincoln, both of Mass.

[73] Assignee: Jersey Nuclear-Avco Isotopes, Inc., Bellevue, Wash.

[22] Filed: Jan. 30, 1974

[21] Appl. No.: 438,029

[52] U.S. Cl. .................... 350/285; 350/7; 350/23; 350/199; 331/94.5 K; 178/7.6
[51] Int. Cl.² ........................................ G02B 27/17
[58] Field of Search ......... 331/94.5; 350/7, 23, 199, 350/285; 178/7.6

[56] References Cited
UNITED STATES PATENTS

| | | | |
|---|---|---|---|
| 3,310,753 | 3/1967 | Burkhalter | 331/94.5 |
| 3,428,812 | 2/1969 | Burke | 350/23 |
| 3,602,572 | 8/1971 | Norris, Jr. | 350/7 |

*Primary Examiner*—Robert J. Webster
*Attorney, Agent, or Firm*—Weingarten, Mayham & Schurgin

[57] ABSTRACT

Method and apparatus for combining a sequence of radiation pulses in plural beams to provide a common axis output beam of increased repetition rate. An optical correction system is employed to compensate for dynamic angular motion of the output radiation beam over the duration of each pulse.

39 Claims, 10 Drawing Figures

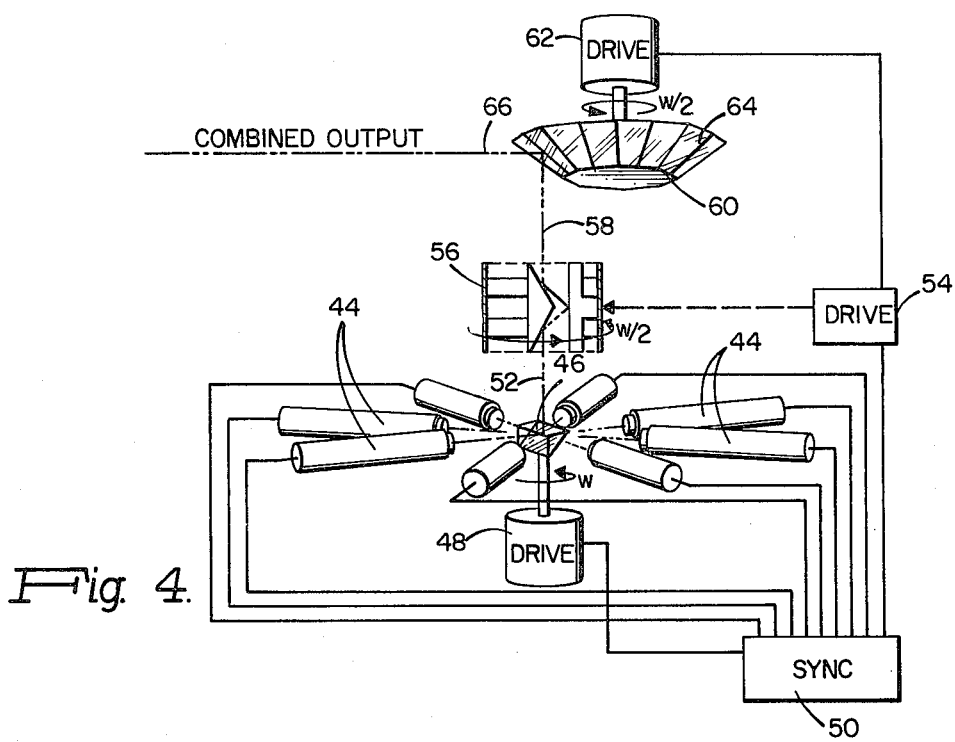
*Fig. 4.*
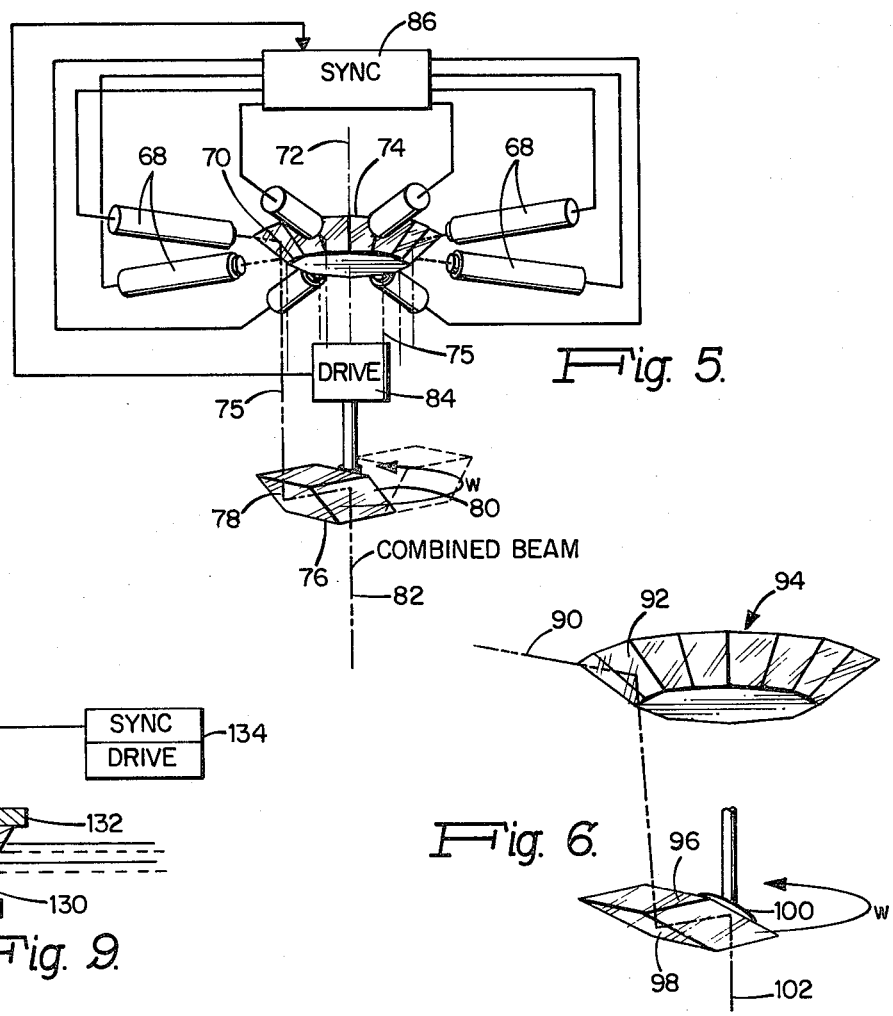
*Fig. 5.*
*Fig. 6.*
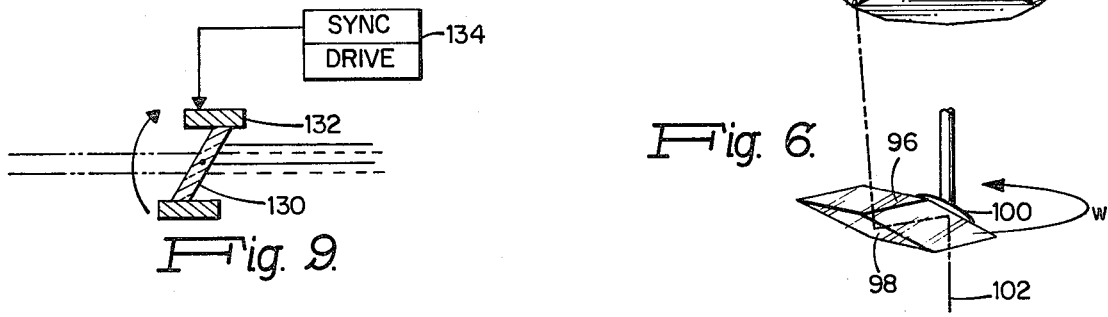
*Fig. 9.*

METHOD AND APPARATUS FOR SEQUENTIALLY COMBINING PULSED BEAMS OF RADIATION

FIELD OF THE INVENTION

This invention relates to pulsed optical beam combining systems for increased repetition rate and in particular to a system for compensating for angular beam travel or deflection over the duration of each pulse being combined.

BACKGROUND OF THE INVENTION

In systems employing pulsed laser radiation, it is often desirable to employ a higher repetition rate for the pulsed laser radiation than is commonly available from a single component laser. Techniques frequently employing rotating optics are known which permit the sequential combination of pulsed laser radiation beams onto a single common axial beam. These and related techniques are represented by U.S. Pat. Nos. 3,543,183; 3,310,753; 3,541,468; 3,568,087.

In one application for high pulse rate in laser radiation, isotope separation is accomplished by isotopically selective laser photoionization in a high flow rate environment of plural isotope types. An example of such a use is described in U.S. Pat. No. 3,772,519, incorporated herein by reference and assigned to the same assignee as the present application. For such an application of laser enrichment, it is typical to find laser beam paths which extend over substantial distances and which nevertheless require a precise and nonvarying angular orientation and superposition of several different frequency laser beams. Laser pulse durations may typically exist in the range of a substantial fraction of a microsecond for this use. Where rotating optics are employed to receive each sequential pulse from plural lasers in order to combine them at a unitary path, the angular motion of these optics will result in an angular motion of the combined laser beams. This motion may appear as a beam deflection as well as a rotation of the plane of deflection from pulse to pulse. In applications of laser enrichment which require the consistent illumination of a predetermined channel throughout the environment of isotopes to be separated, such angular motion in the radiation is intolerable.

BRIEF SUMMARY OF THE INVENTION

In accordance with plural preferred embodiments of the present invention, systems are described which correct for the angular deflection in a composite beam of pulsed laser radiation resulting from the sequential superposition of plural, sequentially pulsed laser radiation beams onto a unitary path.

In particular, continuously rotating optics are typically employed to combine the pulsed output of an array of laser sources. In one embodiment, a set of compensating optics are added to eliminate the angular variation or deflection resulting from the finite duration of each laser pulse and corresponding travel of the rotating optics. In a further embodiment, a particular beam combination system itself eliminates the angular variation resulting from the rotational movement of the combining elements In either case, a small, and often negligible amount of lateral beam displacement without angular variation results from the combining system. An additional optical system is optionally employed to correct for this displacement where desired.

In addition, there are disclosed systems employing several stages of beam combining units of the type described above to achieve an effective increase in laser pulse repetition rate on the order of several magnitudes using either low repetition rate lasers or initial high repetition rate lasers.

DESCRIPTION OF THE DRAWINGS

These and other features of the present invention are more fully set forth below in the detailed description of the preferred embodiments and in the accompanying figures of which:

FIG. 4 illustrates a first embodiment for a pulsed laser beam combining system compensated for angular motion according to the invention;

FIG. 5 illustrates a further form for a pulsed laser beam combining system compensated for angular motion according to the invention;

FIG. 6 illustrates a modification to the system of FIG. 5;

FIG. 9 illustrates an optic system for use in the embodiments of FIGS. 4 and 5 for compensating for beam displacement in the beam of combined laser radiation pulses.

DETAILED DESCRIPTION OF THE PREFERRED EMBODIMENT

In the preferred embodiment of the present invention a system is contemplated for increasing the effective pulse rate of a pulsed laser system by combining, in sequence, the output of a plurality of pulsed lasers into a common beam of pulse rate which is increased by the number of lasers employed in the system. A compensation system is employed in the present invention to correct for dynamic variations in angle of the output beam resulting from movement of the combining optics during each pulse of laser radiation. While of particular utility in a laser system, however, the invention may be employed for combining any pulsed beams.

Figure 1:
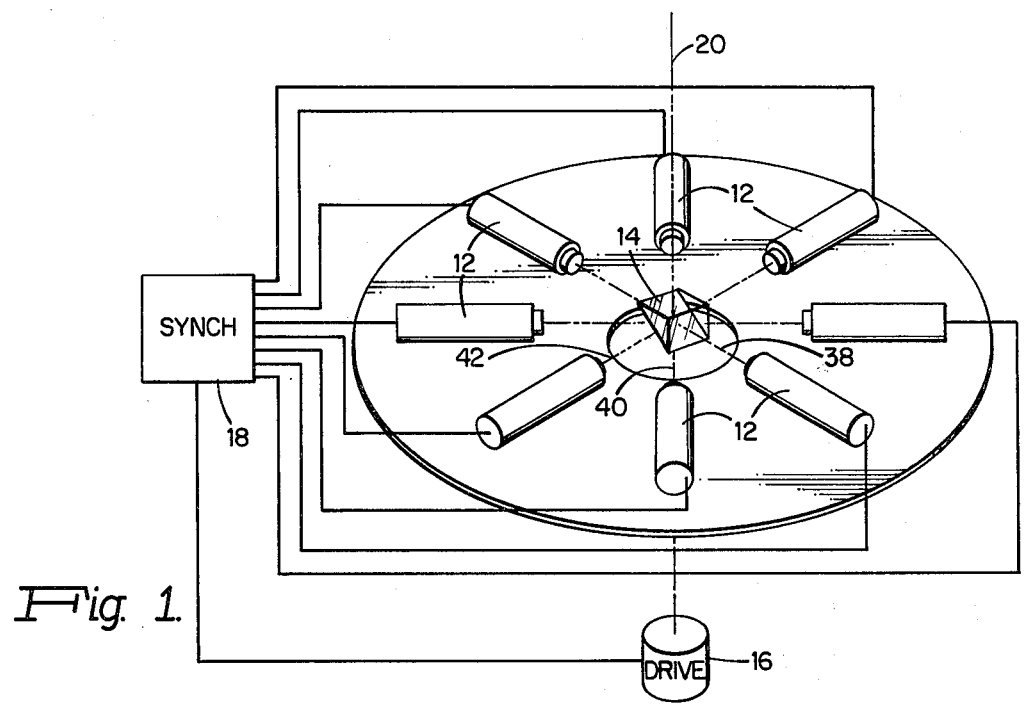
FIG. 1 illustrates one form of pulsed laser beam combining means without compensation for angular beam motion.
Figure 2:
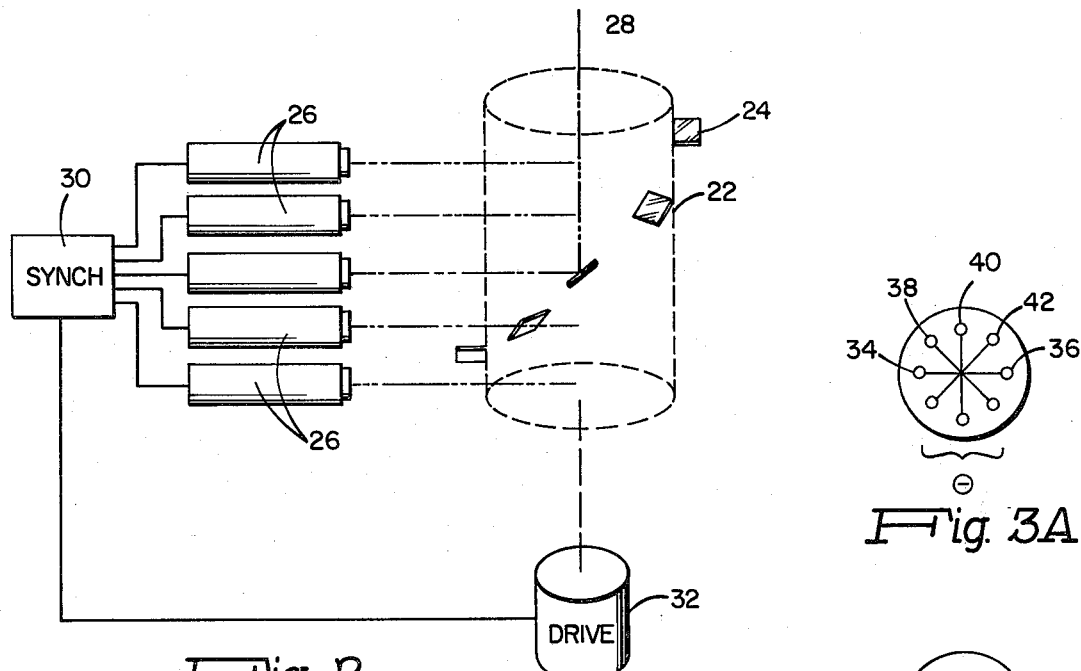
FIG. 2 illustrates a further form of pulsed laser beam combining means without compensation for angular beam motion.

In particular, with reference to FIGS. 1 and 2, there is shown apparatus which operates to combine the output of a plurality of sequentially pulsed lasers into a single pulsed beam with a pulse repetition rate increased by the number of lasers employed in the system. Particularly, with regard to FIG. 1, there is shown an array of lasers 12 positioned to radially direct their output radiation toward a central point for application to a rotating reflecting surface 14, typically a prism. The radiation pulses from the lasers 12 are synchronized with respect to a drive mechanism 16 for the reflector 14 by a synchronization or distributor system 18 so as to provide an output beam 20 upon a common axis. Accordingly, the reflecting surface 14 is directed to receive each beam of radiation from the respective laser systems 12 at the particular moment when that beam will be reflected along the path 20.

In FIG. 2, a similarly functioning system is disclosed employing a rotating cylinder 22 which has a plurality of mirrors 24 placed at staggered positions around the outer circumference thereof at axially displaced locations and directed to reflect laser radiation from a bank of parallel lasers 26 onto a common output path 28. A synchronization system 30 is operative with a drive mechanism 32 for the cylinder 22 to insure that each laser 26 is fired at the instant when its corresponding mirror 24 is aligned to reflect radiation onto the common axial path 28.

Figure 3A:
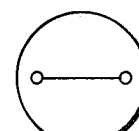
FIGS. 3A–3B illustrate the angular motion resulting from uncompensated laser beam combining systems.
Figure 3B:
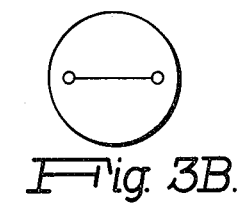

FIGS. 3A and 3B illustrate the character of the dynamic angular variation in the beams 20 or 28 resulting from the finite motion of the reflecting surfaces 14 or 24 during the pulse of radiation in the lasers 12 or 26. In FIG. 3A, this effect is illustrated for the FIG. 1 system. Not only does radiation beginning, for example, at a point 34 and terminating at a point 36 during the pulsed duration for a particular laser 12, traverse an angle $\theta$, but the orientation of the angle $\theta$ is seen to vary with the position of the particular laser 12 fired among positions 38, 40 and 42, for example, shown in FIG. 1.

In lasers used for isotopically selective photoionization the duration of output radiation in each laser pulse may approach a significant fraction of a microsecond thereby giving to the angle $\theta$ a significant and relatively large magnitude over the pulse duration. Such angles can approach a substantial fraction of a degree and can significantly vary the position of the laser radiation in the isotope separation chamber of the type described in the above-referenced U.S. Pat. No. 3,772,519. With respect to FIG. 3B, the phenomenon of varying angle is also shown as it corresponds to the FIG. 2 system but without added complexity of a variation in the orientation of the angle $\theta$.

A system which is operative to compensate for the angular deflection and variation in orientation shown in FIGS. 3A and 3B, is illustrated in FIG. 4. As shown there, a radial array of laser sources 44 (or other pulsed beam sources) direct their respective output beams in pulsed sequence, toward a rotating, reflective surface 46. The surface 46, typically a prism, will be rotating with an angular velocity, $\omega$. The reflecting surface 46 is rotated by a drive system 48 which cooperates with a synchronization system 50 to energize each laser 44 at the appropriate moment for its pulse of radiation to be reflected by the surface 46 onto a common vertical path 52 as has been described above.

The laser radiation in path 52 is directed toward an optical system 56 having an odd number of reflecting surfaces for which the preferred embodiment is a "K" mirror. The "K" mirror 56 is corotating with respect to the reflecting surface 46 at half its angular rate of $\omega/2$. The rotation of "K" miror 56 is synchronized with the rotation of reflecting prism 46 by a further drive mechanism 54. The effect of the corotating "K" mirror 56 is to compensate for the effect of rotation of the orientation of the deflection angle in the output radiation as shown in FIG. 3A. Partially corrected radiation leaving the "K" mirror system 56 is incident along a common axial radiation path 58 to a counterrotating array 60 of reflecting surfaces driven by a drive mechanism 62 at the rate $\omega/2$ in a direction counter to the rotation of reflecting surfaces 64, angled preferably at 45° to the incident radiation and of a number equal to twice the number of lasers 44. This counterrotating array reflects each pulse of laser radiation onto a common output beam path 66. It operates to all but eliminate the angular deflection in the output beam as indicated in FIGS. 3A and 3B. The combined output beam on path 66 will then be nearly free of dynamic deflection and exhibit only a slight displacement. The residual deflection is typically, or may be kept, insignificant for the disclosed application. In place of "K" mirror 56 a "dove", "reversion" or Pechan prism or other suitable optics may be employed.

For reducing the dynamic variation in the FIG. 2 system, only the array 60 needs to be employed. The FIG. 2 system is very suitable for combining a limited number of laser beams with several mirrors per beam placed circumferentially around the cylinder.

An alternative system is illustrated in FIG. 5, wherein a similar radial array of lasers 68 is provided with the radiation thereof directed towards a central point. Surrounding that central point is an array 74 of stationary mirrors 70 which are angled at 45° to reflect each sequential pulse of radiation from the lasers 68 onto plural paths 75 coaxial to a central axis 72 for the mirror array 74. Each path is equidistant from the axis 72 and equally spaced around an imaginary cylinder about that axis. The array 74 is a convenience for laser placement. It is to be understood that any other system or arrangement which provides cylindrical or conical symmetry in the laser beam path is equivalently useable.

The radiation in the path 75 is applied to a rotating solid rhombic prism 76 which has first and second parallel reflecting surfaces 78 and 80 on opposite edges. The first reflecting surface 78 is oriented to intercept each pulse of radiation from reflecting surfaces 70. The axis of rotation for the rhombus 76 is coincident with the axis 72 and passes through the second reflecting surface 80. A common axis output beam path 82 is provided after reflection of the input beam from surfaces 78 and 80. The combined beam path 82 is free of the angular deflection represented in FIGS. 3A and 3B. A drive system 84 for the rhombic prism 76 cooperates with a synchronizer 86 to activate each of the lasers 68 such that the radiation from each reflecting surface 70 is appropriately timed to be centered upon the first reflecting surface 78 in the rhombic prism 76.

The preferred form for practicing the invention is represented by FIG. 5 and employs parallel reflecting surfaces 78 and 80 within the rhombic prism 76. It is, nevertheless, possible to use nonparallel reflecting surfaces as illustrated in FIG. 6. The advantage of employing nonparallel reflecting surfaces as illustrated in FIG. 6 is a minimization of the rotating mass of the rhombic prism. As shown in FIG. 6, incident radiation along paths 90 from each of the plural radially disposed laser systems strike a corresponding mirror 92 in an array 94 similar to the array 74. The mirror 92 are angled more obliquely to the incident radiation so as to direct the reflected radiation not along a coaxial path but inwardly in generally conical symmetry toward a rotating prism 96, and a reflecting surface 98 on the prism 96. Radiation reflected from the surface 98 is directed at an angle towards a further reflecting surface 100 through the prism 96 which, in turn, reflects the laser pulse onto a common central axis 102. The angles of mirrors are selected to provide a common path, although complete freedom of dynamic variation is not possible. Similar rotational drive and laser synchronization elements are employed in the FIG. 6 embodiment as shown in FIG. 5.

Figure 7:
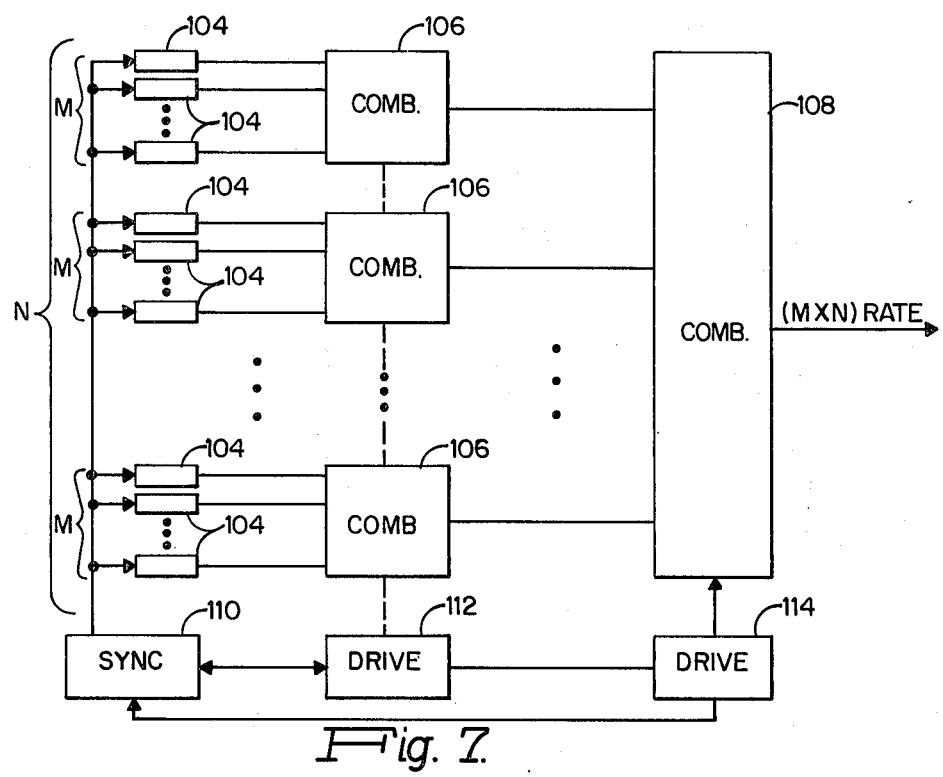
FIG. 7 illustrates a technique for combining a plurality of laser outputs in several stages to provide a greatly increased pulse rate in the resultant, combined output beam.

If each individual laser system employed for the initial laser pulse has a typical maximum repetition rate of 500 pulses per second and it is desired to have an ultimate, effective pulse repetition rate approaching 50 $KH_z$, then a total of 100 lasers must be synchronously combined. For that purpose, it may be desirable to use several stages of combination as illustrated in FIG. 7. As shown there, a plurality of lasers 104 are divided into groups of, for example, 10, with a possible 10 groups in order to make a total of 100 lasers. Each group of 10 lasers applies its sequentially pulsed radiation to an optical combining system 106 which may employ a combining technique similar or identical to that illustrated in FIGS. 4 and 5. Each of the combining systems 106 will provide a unitary, common axis output which is, in turn, provided to a further combining system 108 which may be also similar to those shown in FIGS. 4 and 5. A synchronization system 110 operates to control each of the lasers 104 in conjunction with drive mechanisms 112 and 114 for each of the combining systems 106 and 108. In particular, each pulse of radiation from a system 106 will preferably be timed to occur once per revolution in the rotation of the combining mirror in the combining system 108. As a result, the combining system 108 will operate with a rotational velocity ten times greater than that for the combining systems 106. As a general rule then, the rotational speed for the combining mirrors in any of the systems of FIGS. 4, 5, 6 or 7 will correspond to the repetition rate of pulses on each individual laser input path.

It is alternatively contemplated to activate each laser in a first stage combining system 106 sequentially before activating a laser in the next first stage combining system 106.

In applications requiring extremely high frequency output pulses, for example, on the order of over 50 $KH_z$ repetition rates, it may be desirable or necessary instead of employing a multistaged combining system as illustrated in FIG. 7 to employ a single combining system with up to 100 incident laser radiations but with a relatively low pulse repetition rate in each incident laser beam and correspondingly low angular rotation rate for the combining mirror.

Figure 8:
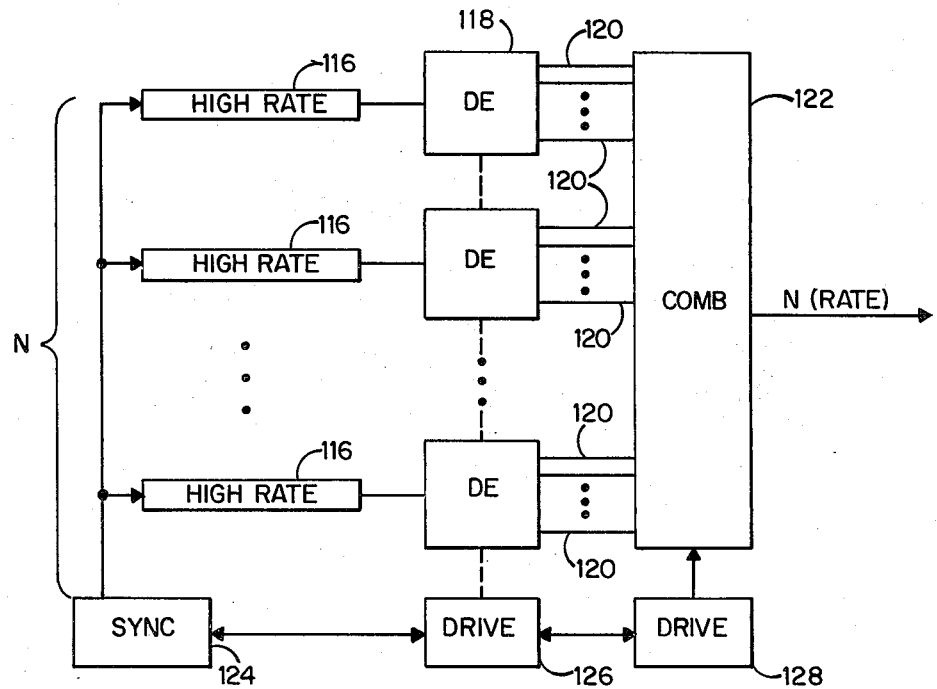
FIG. 8 illustrates a further multiple stage technique for combining a plurality of pulsed laser beams to provide an increased output rate.

With high repetition rate lasers, for example lasers having pulse rates on the order of 4,000 $KH_z$, a system as illustrated in FIG. 8 may be employed. As shown there, high repetition rate lasers 116 are arrayed to direct their output radiation, in timed sequence, to decombining systems 118. Decombining systems 118 correspond to the combining systems illustrated in FIGS. 4 and 5 with the input and output radiation beams interchanged. The decombining systems 118 distribute the high repetition rate pulses from the lasers 116 into a plurality of, for example, 10 independent radiation paths 120, each with a lower pulse repetition rate, in this case by a factor of 10. This plurality of radiation paths may then be combined in a single combining system 122 having a rotational mirror velocity substantially lower than would be required to combine the outputs of lasers 116 separately. A synchronizer 124 operates with drive mechanisms 126 and 128 for the decombining and combining systems respectively to insure the appropriately timed activation of lasers 116 in a manner known in the art.

In all cases of FIGS. 1, 2, 4, 5, 6, 7 and 8, the relationship between the diverse drive mechanisms may be electronic or mechanical as through gears. Similarly, the indicated reflecting surfaces may be either silvered exterior mirror surfaces or internal prism reflecting surfaces as may be desired.

Finally, the combined pulse output beams of FIGS. 4 and 5 with the increased repetition rate, while full or partially corrected for dynamic angular deflections and rotations in orientation during each radiation pulse, will experience a slight translational shift or displacement dependent upon the distance between the reflecting surfaces 46 and 64 in FIG. 4, or 78 and 80 in FIG. 5. While this may typically be minimized to a negligible point, an optical system is illustrated in FIG. 9 which compensates for this translation. In FIG. 9, a plane parallel refractive plate 130 is wobbled in syncrhonism by a driver 134 with the rotation of the combining optics at a rate and magnitude which essentially translates the incident beam onto a parallel output path which overcomes the amount of displacement of the incident radiation over the duration of each laser pulse. To insure the proper orientation of the plate 130, it is rotated within a cylinder 132 so that the effective axis of rotation or wobble of the glass 130 is perpendicular to the plane of input radiation displacement. It is to be noted that the use of synchronously driven optical elements of other types may be alternately employed to compensate for the same displacement.

Having described above a system according to the invention for compensating for angular variations during each pulse of radiation in a combining system for a plurality of pulsed lasers, it will occur to those skilled in the art that various modifications and alterations can be achieved within the spirit of the invention. It is accordingly intended to limit the scope of the invention only as indicated in the following claims.

What is claimed is:

1. A system for combining beams of pulsed radiation comprising:

a plurality of pulsed radiation sources for providing spacially separate beams of radiation pulses in a sequence;

said radiation pulses having a finite time duration;

means for receiving the sequence of spacially separate beams of radiation pulses to direct said separate beams of radiation pulses along a generally common path;

said means for receiving said sequence of beams of radiation pulses to direct them along a generally common path being operative to direct the pulsed beams along said common path substantially without dynamic angular variation in the pulsed radiation beams throughout the finite duration of each rotation pulse.

2. The combining system of claim 1 wherein:

said beams of the sequence of pulsed radiation are distributed about an axis; and said means for receiving said beams to direct them along said common path includes a plurality of reflecting surfaces with at least one of said reflecting surfaces included generally in said common path.

3. The system of claim 2 wherein means are provided for rotating said plurality of reflecting surfaces generally about said common path.

4. The system of claim 2 wherein:

said plurality of reflecting surfaces comprise first and second reflecting surfaces in general facing relationship; and means are provided for rotating said first and second reflecting surfaces in said generally facing relationship about an axis;

said axis passing through said second reflecting surface;

said rotating means including means for positioning said first reflecting surface in the path of each beam of pulsed radiation during the pulse of radiation in that beam;

said first reflecting surface being oriented to reflect that beam toward said second reflecting surface for further reflection onto said common path.

5. The system for combining beams of pulsed radiation of claim 4 wherein said first and second reflecting surfaces are parallel planes.

6. The system for combining beams of pulsed radiation of claim 4 wherein:

the distribution of the plural beams of radiation pulses is conical about said axis; and said first and second reflecting surfaces are in planes inclined to each other at a predetermined angle.

7. The system for combining beams of pulsed radiation of claim 1 wherein said plurality of sources comprises pulsed lasers.

8. The system for combining beams of pulsed radiation of claim 1 wherein said means for receiving the sequence of radiation pulses along spacially separate beams includes.

an optical system of rotating optical elements operative to combine the sequence of spacially separate beams onto said generally common path and providing an angular variation in radiation along said common path during each pulse of radiation along the common path; and rotating optical means responsive to the pulses of radiation along the common path to substantially reduce the angular variation of the radiation pulse along said common path.

9. The system for combining beams of pulsed radiation of claim 8 wherein:

the angular variation in the radiation pulses along said common path include an angular deflection; and said means for reducing the angular variation includes a rotating reflecting surface for reducing the angular deflection.

10. The system for combining beams of pulsed radiation of claim 8 wherein:

said angular variation in the beam of radiation pulses along said common path includes a dynamic angular deflection and a rotation from pulse to pulse in the plane of the angular deflection; and said means for reducing the angular variation includes:

means responsive to radiation along said generally common path for reducing the rotation in the plane of the angular deflection; and means for reducing the angular deflection in the pulses of radiation along said common path.

11. The system for combining beams of pulsed radiation of claim 10 wherein:

said means for reducing rotation of the plane of angular deflection includes an optical system having an odd number of reflecting surfaces in the path of the radiation pulses along said common path, said optical system with an odd number of reflecting surfaces rotating with a first characteristic; and said means for reducing angular deflection includes at least one reflecting surface rotating with a second characteristic in the path of radiation along said common path.

12. The system for combining beams of pulsed radiation of claim 1 further including means for separating material having differing absorption lines responsive to radiation along said common path.

13. In a system of the type having a plurality of pulsed radiation sources which are activated to provide a sequence of spacially separated radiation pulses from the plurality of sources in rotation and having means for directing the sequence of spacially separate pulses onto a generally common path with a dynamic angular variation occurring in the beam of each directed pulse, a system comprising:

means for reducing the angular variation in each directed pulse to provide a generally nonangularly varying beam of directed radiation pulses.

14. A system for combining pulsed radiation comprising:

a plurality of pulsed radiation sources sequentially activated for providing radiation pulses;

means responsive to the sequence of pulsed radiation from said plurality of sources for directing the consecutive radiation pulses from said plural sources along a generally common path; and means operative in association with said directing means for reducing the dynamic angular variation of the radiation along said generally common path during each pulse of radiation.

15. The system for combining pulse radiation of claim 14 wherein said directing means includes an inclined rotating reflecting surface operative to receive each radiation pulse from an array of said plurality of radiation sources.

16. The system for combining pulsed radiation of claim 15 further including a corotating optical system positioned along said generally common path, said corotating optical system having an odd number of reflecting surfaces for the pulses of radiation along said common path.

17. The system of claim 16 wherein said corotating optical system includes a "K" mirror.

18. The system for combining pulsed radiation of claim 16 wherein said corotating optical system includes a "dove" prism.

19. The system for combining pulsed radiation of claim 16 wherein said corotating optical system includes a "reversion" prism.

20. The system for combining pulsed radiation of claim 16 wherein the rate of corotation of said optical system is at one-half the rate of rotation of said reflecting surface.

21. The system for combining pulsed radiation of claim 14 wherein said means for reducing angular variation includes a counterrotating reflector operative to receive the pulses of radiation along said common path and to provide a predetermined angular reflection of said pulses of radiation to reduce said angular variation.

22. The system for combining pulsed radiation of claim 21 wherein the angle of reflection of said reflector is a right angle.

23. The system for combining pulsed radiation of claim 21 wherein said counterrotation is at one-half the rate of rotation of said reflecting surface.

24. The system for combining pulsed radiation of claim 14 wherein said directing means includes a plurality of mirrors positioned for rotation about a common axis and angularly spaced about said axis, said plurality of pulsed radiation sources being arranged to direct the pulses of radiation toward a corresponding one of said plurality of mirrors.

25. The system for combining pulsed radiation of claim 24 wherein said reducing means includes counterrotating one or more reflective surfaces responsive to the radiation along said common path.

26. The system for combining pulsed radiation of claim 14 wherein:
said plurality of pulsed radiation sources are radially arrayed lasers;
reflective means are provided to receive radiation from the radial array of lasers to direct the radiation thereof along a plurality of paths displaced about the line of said common path; and
multiple reflective means are provided with a first reflector rotated about said common path to receive incident radiation from each of said plurality of paths and reflect it toward a second reflector thereof also rotating about said common path to redirect said pulses of laser radiation onto said common path.

27. The system for combining pulsed radiation of claim 26 wherein the radiation reflected by said second reflector is directed along the same axis for each of said plurality of paths.

28. The system for combining pulsed radiation of claim 26 wherein said first and second reflectors are generally parallel.

29. The system for combining pulsed radiation of claim 26 wherein said first and second reflectors have a predetermined non-zero, included angle.

30. The system for combining pulsed radiation of claim 14 further including means responsive to the radiation along said common path for correcting for displacements of each pulse of radiation in the combined output along said common path.

31. The system for combining pulsed radiation of claim 14 wherein said radiation sources are lasers.

32. The system for combining pulsed radiation of claim 14 further including means for separating materials of different absorption lines responsive to the radiation along said common path.

33. A system for combining beams of pulsed radiation comprising:
plural pulsed radiation sources providing a plurality of respective spacially separated beams of pulsed radiation in a predetermined sequence;
an optical system for receiving and directing said beams onto a common output path substantially without variation in the beam angle of output radiation along said common output, said optical system including:
at least one first reflecting surface for receiving input radiation from said radiation sources and at least one second reflecting surface for providing output radiation along said common path;
means for producing continuous rotation of said at least one first and second reflecting surfaces; and
means for controlling the rotation of said first reflecting surface to receive each pulse of radiation in the sequence of spacially separate beams for direction through said optical system to said at least one reflecting surface for
reflection by said second reflecting surface onto said common output path.

34. A system for combining a plurality of beams of pulsed radiations to provide an augmented pulse rate comprising:
a plurality of systems according to claim 1 for providing a plurality of combined outputs about corresponding common paths, the plural outputs along said plural common paths being sequenced according to a predetermined scheme; and
means responsive to the combined laser radiation pulses along said plural common paths for sequentially directing the corresponding radiation pulses along a single common path.

35. A system for combining the pulsed radiation outputs of a plurality of high repetition rate pulsed radiation sources to provide a common output of increased repetition rate comprising:
a plurality of high pulse repetition rate radiation sources;
decombining means for sequentially applying radiation pulses from said plurality of sources along a plurality of separate radiation paths for each source; and
combining means responsive to the radiation along said separate radiation paths for combining the sequenced pulses of radiation along said separate radiation paths into a single common path of high repetition rate radiation pulses.

36. A system for combining the pulsed radiation output of a plurality of pulsed laser radiation sources to provide a single path output of high repetition rate laser radiation comprising:
a plurality of laser radiation sources;
means for sequentially activating said plurality of radiation sources to provide a sequence of radiation pulses from said plurality of sources in rotation;
a rotating reflecting means synchronized with the sequence of laser pulses to receive each radiation pulse from a corresponding laser and reflect it along a generally common path;
a reflecting system having an odd number of reflecting surfaces in the path of incident radiation and positioned to receive the output from said reflecting means along said common path;
means for rotating said reflecting system about said common path in a direction counter to the direction of rotation of said reflecting means and at one-half the rate thereof;
an array of a plurality of reflecting surfaces;
means for rotating said array generally synchronously with said reflecting system so as to sequentially present each of said plurality of reflecting surfaces to corresponding radiation from said reflecting system for each sequential pulse of laser radiation;
the reflecting surfaces of said array being angled to reflect radiation from said reflecting system onto a further common path having compensation for radiation angular variation.

37. A system for combining the pulsed radiation output of a plurality of pulsed laser radiation sources to provide a common output path with augmented pulse repetition rate comprising:
a plurality of pulsed laser radiation sources generally arranged about an axis to direct the radiation thereof towards said axis;
a reflector array having a plurality of reflecting surfaces about said axis each arrayed to receive radiation from a corresponding laser source and to redirect it symmetrically about said common axis at generally equal radial distances therefrom;

further, first and second, reflecting surfaces arranged in a facing relationship;

means for rotating the arrangement of said first and second reflecting surfaces about an axis passing through the first of said first and second reflecting surfaces;

means for controlling the rotation of the first and second reflecting surfaces about said axis to position said second reflecting surface to receive each pulse of laser radiation from said reflector array and direct it toward said first reflecting surface for redirection thereby along said common output path.

38. The system of claim 1 further including means responsive to radiation along said common path for reducing beam displacement in the radiation along said generally common path.

39. The system of claim 16 wherein said corotating optical system includes a Pechan prism.

* * * * *

UNITED STATES PATENT OFFICE
CERTIFICATE OF CORRECTION

PATENT NO. : 3,924,937
DATED : December 9, 1975
INVENTOR(S) : James L. Munroe; Paul Gregory DeBaryshe It is certified that error appears in the above-identified patent and that said Letters Patent are hereby corrected as shown below:

Column 4, line 56, change "mirror" to --mirrors--.

Column 6, line 14, change "syncrhonism" to --synchronism--.

Column 6, line 52, change "rotation" to --radiation--.

Column 8, line 30, change "pulse" to --pulsed--.

Column 9, line 65, after "to said" add --second--.

Signed and Sealed this thirteenth Day of April 1976

[SEAL]

Attest:

RUTH C. MASON
Attesting Officer

C. MARSHALL DANN
Commissioner of Patents and Trademarks